United States Patent
Pettit et al.

[15] 3,687,944
[45] Aug. 29, 1972

[54] PROCESS FOR THE PREPARATION OF BUFALIN AND RELATED COMPOUNDS

[72] Inventors: George R. Pettit, 6232 Bret Hills Drive, Paradise Valley, Ariz. 85253; Leonard E. Houghton, 1 Grosvenor Avenue, Hartford, Northwich, Chesire, England; John C. Knight, 1018 Coolidge Avenue, Kalamazoo, Mich. 49001; Fred Bruschweiler, 1100 East Lemon Street, #2 Tempe, Ariz. 85281

[22] Filed: May 8, 1970

[21] Appl. No.: 35,912

[52] U.S. Cl...260/239.57, 260/239.5, 260/239.55 R, 260/397.1, 260/999
[51] Int. Cl..............................................C07c 173/04
[58] Field of Search......./Machine Searched Steroids

*Primary Examiner*—Henry A. French
*Attorney*—Cifelli, Behr and Rhodes

[57] ABSTRACT

There is provided a novel method of preparing the cardiac active agents bufalin and its immediate precursor resibufogenin from the well known cardenolide, digitoxigenin. The method comprises conducting a ring expansion of the five-membered lactone at C–17 to the corresponding six-membered lactone. In this process the five-membered lactone is cleaved to provide a 20-acetal-21-nor-5βnorchol-14-enate ester. The 20-acetal is protected by the formation of an alkylenethioacetal or similar thio derivative, and the carboxylic residue at C–22 homoligized using a modified Arndt-Eistert sequence. Removal of the protecting thio groups yields the corresponding 20-formyl-21-nor-5β-chol-14-enic acid which is then subjected to ring closure and dehydrogenation to yield the known 14-dehydrobufalin which may be converted by known methods to resibufogenin and bufalin.

25 Claims, No Drawings

3,687,944

PROCESS FOR THE PREPARATION OF BUFALIN AND RELATED COMPOUNDS

FIELD OF THE INVENTION

This invention concerns a novel process for the synthesis of the cardiac active agents bufalin and resibufogenin.

DESCRIPTION OF THE PRIOR ART

Bufalin is the active agent of the Chinese drug Ch'an Su (Japanese Sen-So) and is isolable from the venom of the toad Bufo Bufo gargarizans. Bufalin was isolated in 1939 by Kotake Kuwada and a total synthesis has been reported by Sondheimer et al. (J.A.C.S. 91 1228 (1969)). Heretofore, however no synthesis has been reported using a cardenolide, such as digitoxigenin as starting material.

The 14 (15) epoxy derivative of bufalin, resibufogenin is a commercially available cardiac active agent.

SUMMARY OF THE INVENTION

The invention described herein was made in the course of work under a grant or award from the Department of Health, Education, and Welfare.

The principal modification of the invention is shown in flow chart I below which illustrates the entire reaction sequence from digitoxigenin (3) through bufalin (1) via a modified Arndt-Eistert homologation. The process of the present invention covers the steps from 3$\beta$-acyloxy-14-dehydrodigitoxigenin (4) through 3$\beta$-acyloxy-14-dehydrobufalin (14). An alternative route is schematized on Chart II which will be discussed in detail below.

In the principal process of the present invention digitoxigenin (3) is acylated and treated with acid to form the 3$\beta$-acyloxy-14-dehydrodigitoxigenin (4) which is treated with a base in the presence of an alcohol, which upon neutralization yields 3$\beta$-hydroxy lactol (5a) which need not be isolated. Treatment of the lactol with a strong acid, preferably an organic acid in an alcohol yields the corresponding alkyl 5$\beta$-norchol-14-enate 20-alkylacetal (5b) which is then acylated to protect the free hydroxl groups at C-3.

The acetal moiety of the acylated acetal (5c) will not survive the conditions of an Arndt-Eistert homologation. The acetal (5c) is therefore treated with a thiol, suitably, but not critically an alkylene dithiol to form the corresponding dithio derivative (6). The ester group at C–21 is saponified with a strong base; since this also removes a portion of the acyl groups at C–3, the resultant mixture containing 3$\beta$-hydroxy-and 3$\beta$-acyloxy compounds (7) and (8) is reacylated. The resulting 3$\beta$-acyloxy carboxylate (8) is converted into the corresponding carbonyl halide (9) suitably by the action of oxalyl chloride and treated with diazomethane to give the corresponding methyl-diazoketone (10) which is oxidized to give the 3$\beta$-acyloxy-20-formyl-nor-5$\beta$-chol-14-enic 20-alkylenethioacetal (11) which is dethiolated to yield the 20-formy-21-nor-5$\beta$-chol-14-enic acid (12). The acid (12) is ring closed under Lewis acid conditions to give the 14, 20-bufa-dienolide (13). Dehydrogenation yields the 3$\beta$-acyloxy-14-dehydrobufalin (14a) which may be readily expoxidized to form 3$\beta$-acyloxy-resibufogenin (15a) which may be readily converted to resibufogenin or bufalin.

Chart II illustrates an alternate route between compounds (7) and (11). The acid (7) is sequentially reacted with diazomethane and dihydropyran to form the methyl 3$\beta$-tetrahydropyranyloxy-20-formyl-21-nor-5$\beta$-nor-chol-14-enate (20) which is then reduced to the corresponding 5$\beta$-nor-chol-14-en-23-ol (21). The corresponding 23-(substituted sulfonate) (22) is prepared and reacted with an inorganic cyanide to give the corresponding nitrile (23) which is hydrolyzed to give the 3$\beta$-hydroxy-20-formly-21-nor-5$\beta$-chol-14-enic-20 alkylenethioacetal (25). Conversion of (25) to resibufogenin or bufalin proceeds after 3$\beta$-acylation in accordance with the steps for the conversion of (11) to these products.

Resibufogenin, which may be readily prepared from the known 14-dehydrobufalin by epoxidation according to methods well known in the art is useful as a cardiac, press or and respiratory stimulant and is in commercial and clinical use as such. As mentioned heretofore, bufalin is the active constituent of a traditional Chinese and Japanese medicine and is active as a cardiotropic agent.

DESCRIPTION OF THE PREFERRED EMBODIMENTS

The process of the present invention comprises the conversion of digitoxigenin (3) into resibufogenin (15b) and bufalin(1).

In the preferred embodiment of the process digitoxigenin (3) is acylated, suitably by reaction with an alkanoylating agent such as an acetylating or benzoylating agent such as acetic anhydride, acetyl chloride, benzoyl chloride or the like under the usual conditions followed by 14-dehydration under acid conditions. Any acid dehydrating agent may be used, organic or mineral acids may be employed, among the suitable methods is treatment with gaseous hydrogen chloride in a substantially anhydrous medium, to yield the 3$\beta$-acyloxy-14-dehydrodigitoxigenin (4). Compound (4) is then converted into the corresponding acetal ester (5c).

Compound (4) is taken up in an alcohol, suitably an alkanol, preferably a lower alkanol having 1-5 carbon atoms such as methanol, ethanol or propanol and treated with a strong base. The base may be an alkali base, this term includes strongly alkaline, alkali metal compounds such as alkali metal hydroxides, such as sodium or potassium hydroxide, alkali metal alkoxides such as sodium methoxide or potassium butoxide, or alkali metal aroxides such as sodium phenate. Also included are compounds convertible into such bases on contact with water or an alcohol such as lithium methyl, potassium butyl, sodium hydride and the like. Especially preferred, however, are the alkali metal hydroxides, or the alkoxides corresponding to the alkanol utilized as a solvent. There is employed an excess of base, for example 5–6 moles of base per mole of lactone (4) preferably 2 moles of base are employed. The mixture is agitated at between about 0° and 60°C, preferably at between 10° and 20°C for from about 1 to about 3 hours, 1 hour at room temperature considered adequate. There is then formed the corresponding 3$\beta$-21-dihydroxy-5$\beta$-card-14-enolide (5a).

It is not necessary, or desirable to isolate this compound. The basic solution is neutralized or made just acid. This may be achieved by the addition of an acid, suitably a mineral acid such as aqueous hydrochloric acid. By the addition of an excess of a strong acid, the lactol (5a) is converted into the corresponding alkyl 3β-hydroxy-20 formyl-21-nor-5β-norchol-14-enate 20-alkyl-acetal (5b). A certain amount of the corresponding 3β-acyloxy analog (5c) will also be present, however, the components are not separated at this stage. It is preferred to use a strong organic acid, among these may be mentioned methane sulfonic acid, benzene sulfonic acid, p-chlorotolene sulfonic acid, p-bromobenzene sulfonic acid, toluene sulfonic acid, trichloracetic acid and the like; toluene sulfonic acid being considered especially convenient. Mineral acids may be employed in this step, however, the yields obtained are inferior to those obtained from the use of organic acids. There may be utilized 2–6 moles of acid per mole of steroid (4) originally charged. It is preferred to utilize about 2 moles of the organic acid.

It is a possible modification of the present process that a large excess of the organic acid is added to the basic solution not only for the purpose of effecting the formation of the ester-acetal (5b) but also for the purpose of neutralization of the base. While such a procedure may be more expensive in terms of cost of acid than preneutralization with mineral acid, the saving of an additional step may find advantage in commercial scale snythesis.

It should further be pointed out that the alkyl moiety on the ester and the acetal will be that of the original alkanolic solvent. If a different alkyl moiety is desired, the original solvent must be removed, say by evaporation, and replaced with another solvent prior to the acidification step. The alkyl moieties will then, of course, correspond to the alkyl moieties of the new alcoholic solvent.

The reaction mixture of steroid in alkanol in the presence of acid is allowed to react at temperatures from about 10° to 100°C, suitably at the relfux temperature of the solvent for from about 3 to about 6 hours, the shorter times corresponding to the higher temperatures.

The reaction product is then isolated. In the preferred method the reaction mixture is quenched with water and extracted with a suitable water immiscible solvent such as chloroform. On evaporation there is given a mixture of the alkyl 3β-hydroxy-and 3β-acyloxy-20-formyl-21-nor-5β-nor-chol -14-enate 20-alkyl acetal (5b and 5c).

In the preferred modification the entire mixture is reacylated, suitably by acetylation, for example in acetic anhydride-pyridine, and the product used in the next step without further purification.

The acetal (5c) is then treated with a suitable thiol in the presence of an acid catalyst. There may be employed mono thiols such as alkyl mercaptans, suitably lower alkyl mercaptans such as propyl mercaptan, butyl mercaptan, pentyl mercaptan, and the like. There may also be employed alkylene dithiols, suitably lower alkylenedithiols having one to six carbon atoms, among these ethylene dithio and 1,3-propylene dithiol are especially preferred. As catalysts there may be used any substantially non-aqueous acid, including mineral acids, organic acids or Lewis acids. The yields have been found to vary with the catalyst employed, 70 percent aqueous perchloric acid has been found especially suitable. Boron trifloride and gaseous hydrogen chloride have also been found valuable.

There is utilized an excess of thiol, for example 2–6 moles, preferably 2 moles of dithiol (or 4 moles of mono thiol) per mole of acetal. There is utilized 1 to 5 percent by weight, suitably about 1% by weight of the acid catalyst. The reaction is run at moderate temperatures, about 0° to about 30°C, preferably 10° to 20°C for from about 1 to about 6 hours.

The reaction is quenched with base suitably with moderately dilute aqueous alkali; thereupon the alkali metal 3β-acyloxy-20-formyl-21-nor-5β-nor-chol-14-enate 20-alkylene thioacetal (8a) precipitates out. The aqueous base is extracted with a suitable water immiscible organic solvent such as ether. The alkali metal salt of acid (8a) is separated and converted to the parent acid (8b) in the usual manner.

The organic solvent extract is concentrated and saponified. Saponification of the contents of the organic extract above containing principally the 3β-acyloxy ester (6) is carried out by taking up the ester in a suitable solvent, a lower alkanol being preferred and treating with a suitable base such as an alkali base as defined above, for example alkali metal hydroxides, alkali metal alkoxides and any alkali metal derivatives convertible thereto by reaction with water or an alkanol, may be used to give hydroxy acid (7).

It is our interesting and surprising finding that where the saponifying agent is an alkali metal carbonate such as sodium or potassium carbonate in a lower alkanol, suitably methanol, selective sponification occurs. Thus the ester group at C–22 is saponified to the corresponding salt, while the 3β-acyloxy group is not saponified to the corresponding 3β-alcohol (7).

While it is generally preferred to carry out the saponification using an alkanol as a solvent, other polar solvents such as tetrahydrofuran may also be employed.

There may be employed 2 to 6 moles of base per mole of ester, 2 moles being preferred. The reaction proceeds at temperatures of between 0°C and relfux temperatures of the solvent, say about 100°C. It is preferred, however, to run the reaction at between about 10° and 20°C for between about 15 minutes and about 60 minutes, 30 minutes being sufficient at reflux temperatures.

The reacylation at 3β is carried out in the usual manner using, suitably alkanoyl, aroyl, aralkonoyl or alkanoyl anhydrides or halides in a basic medium as the acylating agent. For the sake of convenience and cost it is preferred to utilize acetic anhydride in pyridine or in any tertiary amine. There are utilized between 2 and 3 moles of acylating agent per mole of 3β-alcohol.

The 3β-acyloxy-21-nor-5β-norchol-14-enic acid (8b) is converted in to the corresponding acid chloride (9). The acid is taken up in a reaction inert solvent, preferably a hydrocarbon solvent such as benzene, toluene, or the like and is treated with a halogenating agent. There may be employed oxalyl chloride or thionyl chloride, of these oxalyl chloride is preferred. Phosphorus trichloride, phosphorus pertachloride or moleculor bromine may be used however, the yields with the reagents are not as good as with the preferred reagents.

There is utilized a slight excess of halogenating agent, suitably an excess of about 10 to about 20 mol percent relative to acid is employed. The reactants are suitably heated under reflux for from about 1 to about 3 hours, although 30 minutes may be adequate. The reaction mixture is evaporated to remove the volatile constituents and the residue treated with diazomethane.

In the preferred procedure an ethereal solution of diazomethane is prepared containing an excess of diazomethane over acid chloride (9) to be used, an excess of about 25 mol percent being preferred. There is added to the diazomethane solution an ethereal solution of the crude acid chloride (9). The acid chloride (9) should be added slowly to the diazomethane solution which should be held at a low temperature, suitably at ice bath temperatures. The reaction mixture is held at this temperature for from about 10 to about 20 hours, suitably for about 15 hours. The reaction mixture is cautiously evaporated and the residue purified, suitably by chromatography on silica gel to yield the diazomethyl ketone (10).

The diazomethyl ketone (10) is oxidized to the corresponding 3$\beta$-acyloxy-20-formyl-21-nor-5$\beta$-chol-14-enic acid alkylenethioacetal (11) by the action of a finely divided metal, or silver oxide in the presence of a base.

In the preferred procedure the diazoketone (10) is taken up in a suitable solvent such as an alkanol or an ether. An ether such as diethyl ether, tetrahydrofuran or dioxan are preferred, since the use of alkanols gives rise to cholenate esters which must be saponified at a later stage. A suspension of a finely divided transition metal in a similar solvent as used above is prepared, copper, nickel, chromium, and silver give good results, zinc and iron have been found operative but yields are not satisfactory. Especially preferred, however, is a suspension of silver oxide. It is our surprising discovery that the silver oxide has no adverse effect upon the thioacetal group at C-20. There is also added mild base to solvate the acid as it is formed. Any mild base may be employed, alkali metal carbonates and mild organic bases such as triethylamine may be employed. It has been found useful to add about 10-40 parts by volume of a dilute aqueous solution of an alkali metal thiosulfate, for example sodium thiosulfate. This reagent is not a critical component, however, the use thereof has been found to improve yields. The reaction is suitably carried out a slightly elevated temperatures, temperatures between 20° and 60°C are suitable, and temperatures of between 30° and 40°C are preferred for from about 1-3 hours, the exact time depending on the reagent and temperature employed.

The thio groups are then removed from the 20-alkylene thioacetal moiety of acid (11) to give the 3$\beta$-acyloxy-20-formyl-21-nor-5$\beta$-chol-14-enic acid (12). It was found that the conventional mode of removing such groups i.e., treatment with cadmium carbonate in the presence of mercuric oxide was merely marginally operative. Transition metal salts in the presence of the corresponding oxides are, however, operative. Among these may be mentioned nickel chloride with nickel oxide, lead chloride, nitrate or acetate with lead oxide, silver chloride with silver oxide, arsenic chloride with arsenic oxide, antimony chloride with antimony oxide, thallium chloride with thallium oxide, mercuric chloride with mercuric oxide and nickel chloride per se. Among these reagents mercuric chloride/mercuric oxide is especially preferred. The reactants are taken up in a suitable solvent such as alkanoic acid, preferably glacial acetic acid and heated to between 50° and 110°C suitably on a steam bath. It is preferred to operate at a bath temperature of between 60°C and 90°C. It has been found that temperatures above the permissive range are contraindicated. While it appears to be necessary to carry out this reaction at a pH less than 7, highly acidic conditions should be avoided as these would cause the undesired, but thermodynamically favored shift of the double bond from $\Delta8^{14}$ to $\Delta8^{(14)}$. The acid (12) is then isolated. A suitable isolation method comprises filtration, dilution with water, extraction with a suitable water immiscible solvent and evaporation of the extract.

The acid (12) is then subjected to ring closure to yield the desired bufa-14,20-dienolide (13). Strong organic acids and certain Lewis acids have been found to be satisfactory lactonizing agents. Among the organic acids may be mentioned p-toluene sulfonic acid, methane sulfonic acid and the like. The suitable Lewis acids include polyphosphoric acid, boron trifluoride and thallium tri(trifluoroacetate). The use of the common lactonizing agent acetic anhydride/sodium acetate is not favored. The reactants are taken up in a suitable hydrocarbon solvent such as benzene, toluene and the like. There is utilized between 5 and 15 percent by weight, suitably about 10 percent by weight of lactonizing agent based on aldehydic acid (12). The reaction may proceed at temperatures of between about 20° and about 120°C. Since water is generated during the reaction and the presence of water in unfavorable to the desired reaction equilibrium, it is preferred to carry out the reaction at reflux temperatures, removing the water/solvent azeotrope by continuous distillation, suitably by means of a Dean-Stark trap. The reaction time will vary with the catalyst used, however, the reaction times of between about 10 and about 20 hours have been found adequate to remove all of the water produced. The bufa-14,20-dienolide (13) is then isolated, suitably by evaporation of the solvent.

The bufa-14,20-dienolide (13) is then dehydrogenated to the 3$\beta$-acyloxy-14-dehydrobufalin (14a). While the usual dehydrogenation agents are operative, especially fine results have been obtained using sulfur as the dehydrogenating agent. We believe that heretofore sulfur has not been used as a dehydrogenation agent in the steroid art.

In the preferred modification of the method the bufa-14,20-dienolide (13) is taken up in a solution of sulfur in carbon disulfide. The carbon disulfide is evaporated to give a finely divided and intimate mixture of the reactants. There is utilized a large excess of sulfur, between 2 and 4 parts by weight of sulfur relative to the bufa-14,20-dienolide (13) have been found suitable. The mixture is then heated, suitably under a gentle flow of inert gas, nitrogen being preferred. Preferably, heating is carried out in a metal bath to bath temperature of between 180° and 250°C, suitably between about 200° and 225°C for from about 15 to about 30 minutes. The optimum conditions may be determined by sampling and analysis of the samples by thin layer chromatography. The product (14a) is extracted with a suitable solvent and purified, chromatography being a suitable mode of purification.

14-Dehydrobufalin acetate (14a) is a known compound which may be converted into resibufogenin by epoxidation and thence to bufalin by reduction of the epoxy ring.

In an alternate modification of the process of the present invention the 3β-hydroxy-20-formyl-21-nor-5β-nor-chol-14-enic acid 20-alkylenethioacetal (11).

There is prepared an ethereal solution of diazomethane which is maintained at low, suitably ice bath temperatures, and there is added slowly thereto an ethereal solution of the acid (7). An excess, suitably a 25 mol percent excess of diazomethane is employed and the corresponding methyl 5β-norcholanate isolated in the usual manner. Alternatively, a solution of the acid (7) in a lower alkanol of one to five carbons, suitably methanol or ethanol is treated with an excess of boron trifluoride at between 0° and 30°C, suitably at about 20°C to yield the alkyl 5β-norchol-14-enate corresponding to the alkanol employed.

The ester is then taken up in dihydropyran in the presence of an acidic catalyst. Organic acids such as p-chlorotoluene, sulfonic acid or benzene sulfonic acid are preferred. There are utilized between 2 and 5 percent by weight of acid. The reactants are then heated under reflux for from about one-half to about 2 hours, suitably for about 1 hour and the surplus solvent distilled off to yield the desired methyl 3β-tetrahydro pyranyloxy-5β-norchol-13-enate (20).

The ester (20) is then taken up in ethereal solvent such as ether, tetrahydrofuran or the like and added to a solution of lithium aluminum hydride in a similar solvent or in benzene. There is utilized a small excess of lithium aluminum hydride suitably from 0 to 10 mol percent excess, preferably a 5 mol percent excess at temperatures of between 0° and 20°C for from about 30 to about 120 minutes. The reaction mixture is then worked up. In order to preserve the tetrahydro-pyranyloxy group and also to dissolve the aluminum salts produced in this reaction it is preferred to quench the reaction with aqueous alkali rather than with acid as is customary, 40 percent aqueous sodium hydroxide has been found most suitable for this purpose.

The 21-nor-5β-norchol-14-en-23-ol (21) thus produced is converted into the corresponding substituted sulfonate (22). Any of the common substituted sulfonyl halides may be employed, among these may be mentioned methane sulfonyl chloride, benzene sulfonyl chloride, p-toluene sulfonyl chloride and the like. The alcohol (21) is taken up in a suitable basic solvent, an organic amine such as pyridine or triethylamine being preferred and the sulfonyl halide added thereto. There is employed a small excess, say about 10–25, suitably about 15 mol percent of halide. The reaction conditions may vary between 8 to 12 hours at ambient temperature to about 2 hrs at 50°C. The sulfonate is then isolated in the usual manner and taken up in a non-hydroxylic polar solvent, among these may be mentioned dimethyl formamide, dimethyl sulfoxide, tetramethylurea and the like. There is added thereto an excess of between 5 and 20, suitably about 10 mol per cent excess of an alkali metal cyanide such as sodium cyanide. The mixture is reacted at from about 15°C to about 120°C or reflux temperature of the solvent for from about 8 to 12 hours to about 1 hour higher temperatures calling for lower reaction time. The reaction product 3β-pyranyloxy-21-nor-23-cyano-5β-chol-14-en 20-alkylenethioacetal (23) is then isolated. It is preferred to isolate the product by evaporation of the solvent, suitably under reduced pressure, on a steam bath, in a rotary evaporator, followed by extraction of the residue with a suitable solvent such as chloroform, methylene chloride or the like.

The nitrile (23) is then hydrolysed to the corresponding acid. Base hydrolysis is preferred. The nitrile is taken up in a hydroxylic solvent, a high boiling solvent, for example an alkylene glycol such as ethylene glycol is especially preferred. The preferred base is an alkali metal hydroxide such as potassium hydroxide. There is utilized an excess of alkali suitably a 2 to 6 mols preferably about 3 mols of alkali per mole nitrile. The reaction proceeds, suitably under nitrogen for from about 1 to about 4 hours, suitably for about 3 hours at from about 30°C to about 200°C, preferably at about 190°C. The reaction mixture is then worked up.

The major portion of the solvent is evaporated under reduced pressure and the residue dissolved in water and acidified with, say mineral acid, concentrated hydrochloric acid is especially suitable. The resultant acid (24) is extracted from the aqueous suspension with a suitable water immiscible solvent such as chloroform or ether.

Upon evaporation of the solvent the 3β tetrahydropyranyloxy 20-formyl-21-nor-5β-chol-14-enic-20 alkylenethioacetal (24) is hydrolyzed and acylated to give the corresponding 3β-acetate. Acid hydrolysis is required to remove the tetrahydropyranyloxy group. However, it is preferred that the acid moiety is not esterified in the process. In the preferred procedure the acid (24) is taken up in a reaction inert solvent suitably an alkanol and treated with an acid in the presence of water at ambient temperature. In a preferred modification the acid is taken up in methanol to which is then added a strong organic acid, such as toluene sulfonic acid on the like. There is utilized from about 1 to about 5 percent by weight of acid. The mixture is stirred for from about 2 to about 6 hours, suitably for about 3 hours at ambient temperature. Evaporation of the solvent yields the corresponding 3β-alcohol (25) which is acylated in the usual manner described herein above, suitably with acetic anhydride/pyridine to yield the aldehydic acid (11).

CHART I

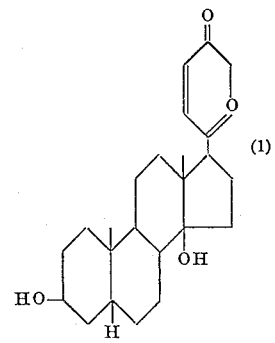

(1)

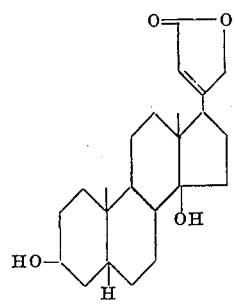
(3)
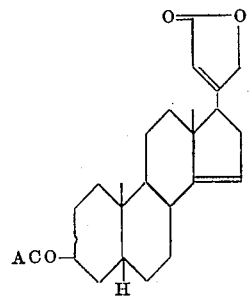
(4)
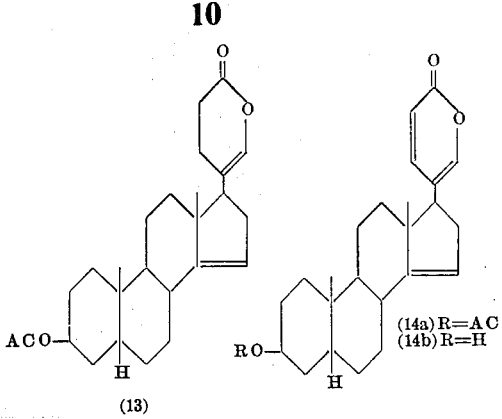
(13)    (14a) R=AC
        (14b) R=H
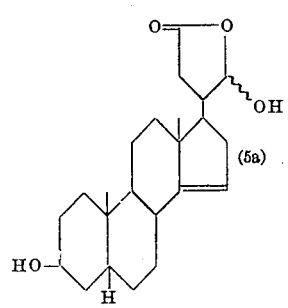
(5a)
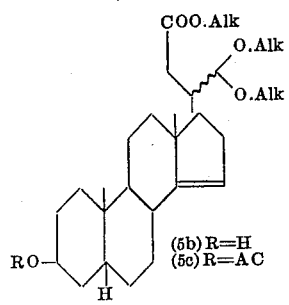
(5b) R=H
(5c) R=AC
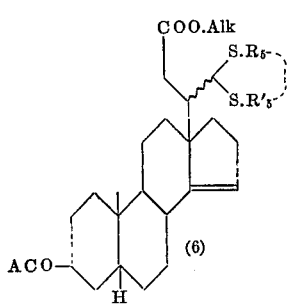
(6)
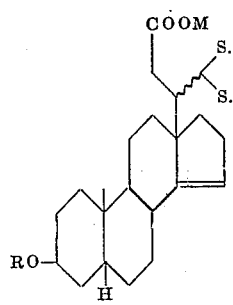
(7) R=H, M=H
(8a) R=AC, M=Alkalimetal
(8b) R=AC, M=H
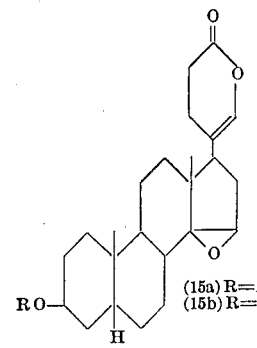
(15a) R=AC
(15b) R=H
In the above  AC = Acyl
              Alk = Alkyl
              X = Halogen
              $R_5, R'_5$ = alkyl, when optionally joined
thus  $R_5 \cdots R_5'$; the group-alkylene
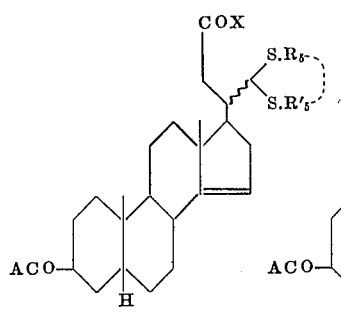
(9)
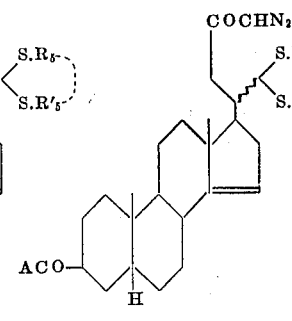
(10)
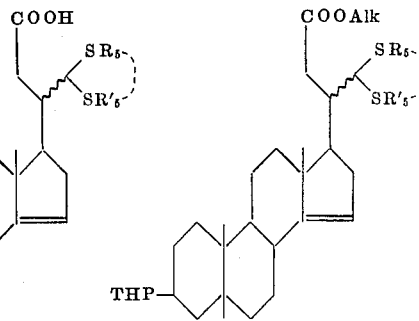
(7)    (20)
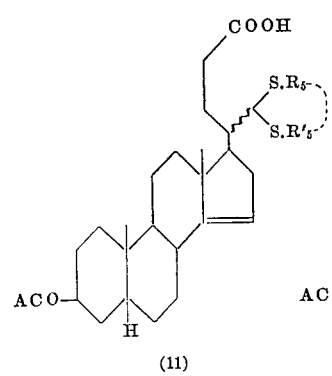
(11)
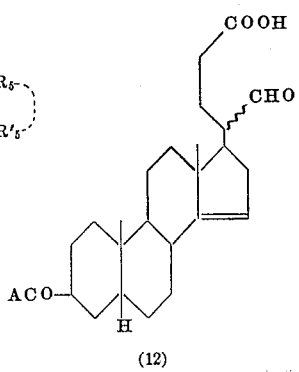
(12)
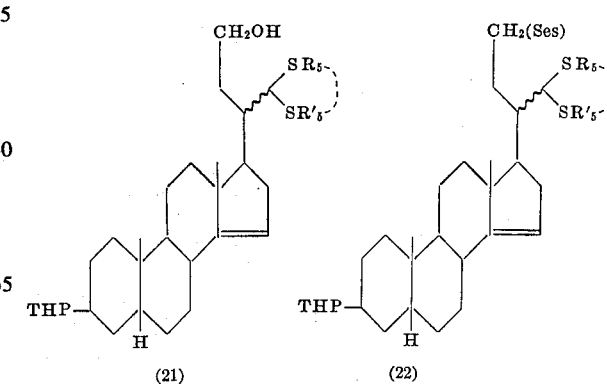
(21)    (22)

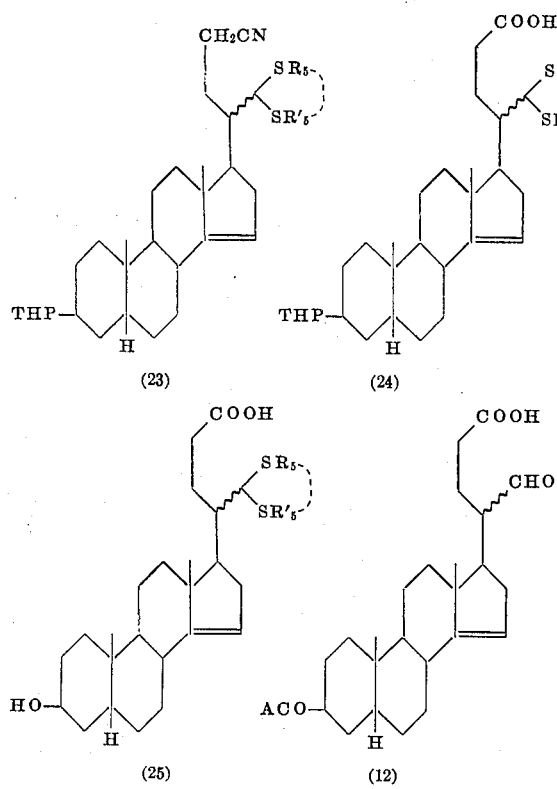

In the above
AC=acyl  Alk=Alkyl
THP=Tetrahydropyranyloxy
$R_5, R'_5$=alkyl, when optionally joined
thus $R_5$ $R'_5$, the group=alkylene (ses)=substituted sulfonyl

EXAMPLE I

3β-Acetoxy-21-Hydroxy-5β-Card-14-Enolide (5a)

To a solution of sodium methoxide prepared from methanol (600 ml) and sodium (17.5 g) was added 14-dehydrodigitoxigenin acetate (4) (19g) [prepared by the method of G. Bach., J. Capitaine, and C.R. Engle, Can.J. Chem., 46, 733 (1968).] as a suspension in methanol (600 ml). The resulting solution was stirred in a nitrogen atmosphere 3 hr at room temperature. Upon cooling the solution was acidified with 2 N hydrochloric acid (500 ml), diluted with water (800 ml), and extracted (4 times) with ether. Washing the combined ethereal extract with water and concentration under reduced pressure yielded a colorless oil (19 g). A pmr spectrum of the product was consistent with the structure of 3β-acetoxy-21-hydroxy-5β-card-14-enolide (5a)

EXAMPLE II

Methyl 3β-Acetoxy-20 Formyl-21nor-5β-norchol-14-enate 20-Methylacetal (5c)

A solution of 3β-acetoxy-21-hydroxy-5β-card-14-enolide (5a), (19.0 g) in methanol (600 ml) containing p-toluene sulfonic acid (0.8 g) was heated under reflux for 3.5 hours. Water (600 ml) was added to the solution and the resulting mixture extracted with chloroform (3 × 200 ml). The chloroform extract was washed with water and concentrated to an oil (20.2 g). The oil comprises a mixture of 3β-acetoxy and 3β-hydroxy compounds. The oil is taken up in pyridine and acetylated with acetic anhydride to yield methyl-20-formyl-21-nor-5β-norchol-14-enate 20-methyl acetal (5c). The crude product contains a certain amount of the corresponding 3β-alcohol (5a).

A 0.22 g aliquot of the oil was purified by preparative layer chromatography (4:1 chloroform-ethyl acetate mobile phase). The principal zone was separated and eluted with ethyl acetate to afford 0.15 g of oily acetal (5 c): pmrδ, δ 0.98 (18 and 19 methyls), 3.34–3.42 (for closely spaced signals corresponding to the acetal methoxyl in each of the C–20 epimers), 3.68 (methyl ester), 4.14 (3α-proton), 4.28 (acetal proton), and 5.18 (olefinic proton at C–15).

EXAMPLE III

3β-Acetoxy-20-Formyl-21-nor-5β-norchol-14-enic 20-Ethylenethioacetal

Methyl 3β-acetoxy-20-formyl-21-nor-5β-norchol-14-enate 20-methyl acetal (5c) (20 g) in ethanedithiol containing 70 percent perchloric acid (0.2 ml) was allowed to remain at room temperature 3 hr. The mixture was diluted with ether (120 ml) and washed with 2 N sodium hydroxide 2 × 50 ml). Sodium 3β-acetoxy-20-formyl-21-nor-5β-norchol-14-enate 20-ethylene thioacetal (8 a) separated and was collected, washed with water, suspended in chloroform and acidified. After washing the chloroform phase with water and removal of solvent, the corresponding acid (8 b) was obtained as a colorless solid (12.5 g). Several recrystallizations from ethyl acetate-hexane provided an analytical sample as crystals melting at 126°–129°: $\nu_{max}$ 3425–2550, 1740, and 1700 cm$^{-1}$; pmr, δ 0.98 (18 and 19 methyls), 2.05 (acetate methyl), 3.20 (thioacetal methylene), 4.91 (thioacetal proton), 5.05 (3α-proton), 5.17 (olefinic C–15 proton), and 9.20 (carboxylic acid proton).

Anal. Calcd for $C_{27}H_{40}O_4S_2$: C, 65.66; H, 8.18: S, 13.02. Found: C, 65.46; H, 8.01; S, 13.16.

The ethereal extract obtained as noted in the preceding paragraph was concentrated to a colorless oil (7 g) which was saponified employing 2 N sodium hydroxide methanol (1:1, 50 ml). The corresponding 3β-alcohol (7) was obtained as an oil (5.2 g) but acetylation (acetic anhydride-pyridine) provided an additional 5.2 g of crystalline acid (8 b).

EXAMPLE IV

Diazomethyl 3βAcetoxy-20δ-Formyl-21-nor-5 βNorchol-14-en-23-one 20-Ethylenethioacetal (10)

A solution composed of benzene (250 ml), oxalyl chloride (7 ml) and 3β-acetoxy-20-formyl-21-nor-5β-chol-14-enic 20-ethylenethioacetal (8 b) (7.0 g) was heated at reflux 2 hr. Solvent was removed under reduced pressure, dry benzene was added and the solution again concentrated to a pale yellow oil ($\nu_{max}$neat 1800, 1735, and 1680 cm$^{-1}$) principally comprising 3β-acetoxy-20-formyl-21-nor-5β-nor-chol-14-en-chloride ethylenethioacetal (9). Diazomethane prepared from 7 g of nitrosomethylurea was distilled with ether from 50 percent aqueous potassium hydroxide (at ice-bath temperature) and treated (dropwise) with an ether (100 ml) solution of the crude acid chloride (9) (7.2 g) prepared above. Before cautiously removing solvent, cooling was continued 14 hr. The benzene solution of the yellow oily residue was chromatographed on silica gel. Elution with 93:7 hexane-ethyl acetate gave diazo methyl 3β-acetoxy-20-formyl-21-nor-5β-norchol-14- en-23-one 20-ethylene thioacetal (10) (4.0 g) as a pale yellow oil: $\nu_{max}^{neat}$ 2100, 1735, and 1640 cm$^{-1}$; pmr, 0.97 (18 and 19 methyls), 2.02 (acetate methyl), 3.17 (thioacetal methylenes), 4.92 (thioacetal proton) 5.04 (3α-proton), 5.16 (C-15 olefinic proton), and 5.29 (diazoketone proton); mass spec, m/e 488 (M-28, loss of nitrogen).

EXAMPLE V

3β-Acetoxy-20-Formyl-21-nor-5β-Chol-14-enic 20-Ethylenethioacetal

A solution of the diazoketone (10) 4.0 g) in dioxane (20 ml) was added (dropwise) to a stirred suspension of freshly prepared silver oxide (from 4.0 g of silver nitrate) in dioxane (40 ml) containing 10 percent aqueous sodium thiosulfate (15 ml) and 3 percent potassium carbonate (0.5 ml). The reaction temperature was maintained at 60° and 1 hr later 90 percent of the theoretical amount of nitrogen had been evolved. Upon cooling the black mixture was filtered (twice) using Celite and 10 percent potassium carbonate (50 ml) was added to the filtrate. The aqueous mixture was extracted with hexane-ether (1:1, 50 ml) and the organic solvent washed with 10 percent potassium carbonate (3 × 25 ml). The combined carbonate extract was acidified with 2 N hydrochloric acid and the solution extracted with chloroform (3 × 50 ml). The combined chloroform extract was washed with water and concentrated (reduced pressure) to afford 3β-acetoxy-20-formyl- 21-nor-5β-chol-14-enic 20-ethylene thioacetal (11) (3.2 g) as a pale yellow solid. Three recrystallizations from ethyl acetate-hexane yielded the analytical sample as colorless crystal clusters melting at 176°–180°; $\nu_{max}$ 3500, 2700, 1740, and 1700 cm$^{-1}$; pmr, δ 0.90 and 0.98 (18 and 19 methyls), 2.02 (acetate methyl), 3.20 (thioacetal methylenes), 4.90 (thioacetal proton), 5.04 (3α-proton), 5.18 (olefinic C-15 proton), and 8.55 (carboxylic acid proton).

Anal. Calod for $C_{28}H_{42}O_4S_2$: C, 66.34; H, 8.35. Found: C, 65.87; H, 8.39.

EXAMPLE VI

Methyl 3β-Tetrahydropyranyloxy-20-Formyl-21-nor 5β-Norchol-14-enate 20-ethylenethioacetal (20)

Diazomethane prepared from 7 g of nitrosomethyl area was distilled with ether from 50 percent aqueous potassium hydroxide (at ice bath temperature) and treated (dropwise) with an ethereal solution of 3β-hydroxy-20-formyl-21-nor-5β-chol-14-enic 20-ethylene thioacetal (7.4 g) (prepared in accordance with example III supra). The mixture is held at this temperature for 15 hours and the solvent removed cautiously. The residual oil is taken up in 100 ml of dihydropyran in the presence of toluene sulfonic acid (150 mg). The mixture is heated under reflux and the surplus dihydropyran removed by distillation. The residual oil is chromatographed on silica gel, using benzene as eluent, to yield, on evaporation of the solvent methyl 3β-tetrahydro pyranyloxy-20-formyl-21-nor-5β-norchol-14-enate 20-ethylene thioacetal (20).

EXAMPLE VII

3β-Tetrahydropyranyloxy-20-Formyl-21-nor-5β-nor Chol-14-en-23-ol Ethylenethioacetal (21)

A solution of methyl 3β-tetrahydropyranyloxy-20-formyl-21-nor-5β-norchol-14-enate 20-ethylene thioacetal(5.88 g) in dry diethyl ether (100 ml) is added (30-min period) to a cold (ice-bath) mixture of lithium aluminum hydride (2.4 g) and dry diethyl ether (600 ml). Stirring at ice-bath temperature is continued 2.5 hr. Excess lithium aluminum hydride is removed by cautious addition of 20 ml of cold 40 percent aqueous sodium hydroxide solution, followed by 100 ml of ice water and the ethereal layer is separated. The aqueous phase is extracted with diethyl ether and the combined ethereal extract is washed with water. Evaporation of the ether gives a colorless oil which slowly solidifies Recrystallizing the residue from acetone-ligroin affords alcohol (21). Concentrating mother liquors provides a pale brown oil. The mother liquor residue in benzene is chromatographed on basic alumina (200 g). Elution with the same solvent gives an additional amount of alcohol (21).

EXAMPLE VIII

3β-Tetrahydropyranyloxy-20-Formyl-21-nor-23-Cyano-5β-nor-Chol-14-en 20Ethylenethioacetal (24)

To a solution of alcohol (21) (5.12g) from (VII) above, in pyridine (20 ml) is added at 0° with stirring, methanesulfonyl chloride (3.0 g) in pyridine (5 ml). Before dilution with diethyl ether, stirring is continued 3 hr at ice-bath temperature. The ethereal solution is repeatedly washed with water and concentrated to a pale yellow oil (without any appreciable infared hydroxyl absorption). A solution of the oily residue in 1:1 ligroin-benzene is chromatographed on basic alumina. Elution with the same solvent gives the mesylate (22) as a colorless oil that crystallizes on standing. Without further purification the mesylate is dissolved in dimethylformamide (100 ml). The solution is stirred at room temperature and sodium cyanide (2.0 g) was added. Stirring is continued 22 hr and the pale yellow solution is diluted with water, cooled and filtered. The white solid is crystallized from acetone-water to give 3β-tetrahydropyranyloxy-20-formyl-21-nor-5β-23-cyano-norchol-14-en20-ethylene thioacetal (24)

EXAMPLE IX

3β-Tetrahydropyranyloxy 20-Formyl-21-nor-5β-Chol-14-enic 20-Ethylenethioacetal

A solution of nitrile (24) (4.56 g) and potassium hydroxide (14 g) in ethylene glycol (140 ml) is heated at reflux and stirred in a nitrogen atmosphere 3 hr. Upon cooling, the clear pale yellow solution is diluted with water and acidified with concentrated hydrochloric acid. The aqueous mixture is extracted with diethyl ether and the combined extract is concentrated to an oil. Trituration with acetone causes slow crystallization to yield 3β-tetrahydropyranyloxy 20-formyl-21-nor-5 β-chol-14-enic 20-ethylene thioacetal.

EXAMPLE X

3β-Acetoxy-20-Formyl-21-nor-5β-Chol-14-enic 20-Ethylenethioacetal

To a solution of 3β-tetrahydropyranyloxy-20-formyl-21-nor-5β-chol-14-enic 20-ethylene thioacetal (1.1g) in methanol (50 ml) is added water (1 ml) and p-toluene-sulfonic acid (0.10 g). After stirring at room temperature 3.25 hr, the solution is diluted with water and extracted with diethyl ether. Concentrating the ether layer gives an oil which is held in vacuo for 2 hr at 60° and then dissolved in a mixture of acetic anhydride (5 ml)-pyridine (5 ml). The solution is allowed to stand at room temperature overnight, diluted with ice water and extracted with ether. The ethereal layer is washed with 2N hydrochloric acid and saturated sodium bicarbonate solution, and evaporated. Crystallizing the residue from aqueous methanol gives 3β-acetoxy-20-formyl-21-nor-5β-chol-14-enic 20-ethylene thioacetal (10).

EXAMPLE XI

3β-Acetoxy-20δ-Formyl-21-nor-5β-Chol-14-enic Acid (12)

A mixture prepared from 90 percent acetic acid (10 ml), 3β-acetoxy-20-formyl-21-nor-5β-chol-14-enic 20-ethylene-thioacetol (11) or (0.5 g), mercuric chloride (0.5 g), and red mercuric oxide (0.25 g) was heated (steam bath) for 25 min. On cooling, the solution was filtered through Celite. The filtrate was diluted with water and extracted with chloroform (3 × 15 ml). The combined chloroform extract was washed with water and concentrated to a colorless oil (0.45 g). A pure sample of 3β-acetoxy-20δ-formyl-21-nor-5β-chol-14-enic acid (12) was readily obtained by preparative thin layer chromatography using 7:3:0.1 ethyl acetate-ligroin-acetic acid as mobile phase. The oily specimen of aldehyde (12) exhibited $\nu_{max}$ 3500–2400 and 1730–1690 cm$^{-1}$; pmr, δ 0.90 and 0.98 (18 and 19 methyls) 2.07 (acetate methyl), 5.06 (3α -proton), 5.18 (olefinic C–15 proton), 7.86 (carboxylic acid proton), and 9.55 (aldehyde proton).

EXAMPLE XII

3β-Acetoxy-5β-Bufa-14,20-Dienolide (13)

Using a Dean-Stark apparatus a solution composed of dry benzene (50 ml), 3β-acetoxy-20-formyl-21-nor-5β-chol-14-enic acid (12) (0.2 g), and p-toluene-sulfonic acid (0.025 g) was heated at reflux 16 hr. The yellow oil obtained by evaporation of solvent was subjected to preparative layer chromatography (4:1 hexane-ethyl acetate mobile phase). Elution of the major zone with chloroform led to 3β-acetoxy-5β-bufa-14,20-dienolide (13) (0.05 g) which crystallized from hexane as needless: mp 165°–167°; $\nu_{max}$ 1780, 1735, and 1675 cm$^{-1}$; pmr, δ0.83 and 1.0 (18 and 19 methyls), 2.06 (acetate methyl), 5.07 (3α-proton), 5.18 (C–15 olefinic proton), and 6.40 (C–21 olefinic proton).

EXAMPLE XIII

14-Dehydro bufalin (14)

An intimate mixture prepared by evaporating a solution of 3β-acetoxy-5β-bufa-14,20-dienolide (13) (0.04 g) and sulfur (0.12 g) in carbon disulfide was heated (metal bath) at 208° for 24 min. The time and temperature variables for this dehydrogenation reaction were determined by a series of thin layer chromatographic appraisals. After cooling, the principal product, was isolated by preparative layer chromatography (4:1 hexane-ethyl acetate). The product (0.009 g) was eluted by chloroform and crystallized from hexane to afford colorless prisms of 14-dehydrobufalin acetate (14) melting at 170°–172° (mass spec M$^+$ 410). The synthetic specimen of 14-dehydrobufalin was identical with an authentic sample prepared from natural bufalin.

The identical composition of both specimens was confirmed by results of thin layer chromatographic, proton magnetic resonance and infrared spectral (in potassium bromide) comparison.

EXAMPLE XIV

In accordance with the procedures of Example I–XII, but where, in place of 14-dehydrodigit-oxigenin 3β-acetate there is utilized the corresponding formate, propionate, butyrate or valerate, or benzoate, there is obtained the corresponding 3β-formyl-, -propionyl-, butyryl, -valeryl-, or -benzoyl-5β-bufa-14,20-dienolide.

EXAMPLE XV

In accordance with the procedures of Examples III, but where in place of ethane dithiol, in the procedure of example III, there is utilized propane dithiol, butane dithiol, methylmercaptan propylmercaptan, butylmercaptan o-hexylmercaptan there is obtained the corresponding 20-propylene-thioacetal, 20-butylenethioacetal, 20-dimethyl thioacetal, dipropyl thioacetal, dibutyl thioacetal or dihexyl thioacetal, which are converted, by the procedures of examples III–V or VI–X and then XI to the corresponding 3β-acyloxy-20-formyl 21-nor-5β-chol-14-enic acid.

EXAMPLE XVII

Resibufogenin (15 b)

An ether solution of resibufogenin acetate (15 a) (12 mg) was mixed with activated alumina (Woelm, basic activity 3, pH approximately 8–9) and placed in a small column. Following a 24-hr period resibufogenin was eluted by ether and chloroform. Crude product weighed 9.2 mg. Recrystallization from chloroform-methanol gave 6.2 mg of plates with a double melting point 110°–121° and 148–168° (natural resibufogenin melts at 104°–122° and 146°–170°). The synthetic resibufogenin was identical with the natural counterpart and exhibited: $\nu_{max}$ 3070, 2950, 1735, 1640, 1545 cm$^{-1}$ and mass spec M$^+$384, 366 (100 percent), M 18 m/e.

EXAMPLE XVIII

Bufalin (1 a)

The following reduction experiment was performed using dry reagents and equipment. To a solution of resibufogenin (0.105 g) in ether (22 ml) was added (dropwise) an ethereal (20 ml) solution of lithium aluminum hydride (0.275 g). Stirring and cooling at −50° was continued 4 hr. The mixture was carefully treated with wet ether and then diluted with water. The ethereal phase was washed with 10 percent sodium bicarbonate, 1 N hydrochloric acid, and water (three times). Removal of solvent gave 78 mg of crude (five component mixture by thin layer using 95:5 chloroform-methanol) bufalin. A pure specimen of bufalin (18 mg) was obtained by preparative layer chromatography (95:5 chloroform-methanol mobile phase). Recrystallination from methanol-chloroform gave 12.4 mg of needless melting at 242°–243° (natural bufalin from Japan melted at 221°–242° and from Switzerland 212°–240°); mass spec $M^+$ 386, 368, 350, 325, 250, 232, 214, 207, 203, and 147 m/e; ir $\nu_{max}$ 3080, 2945, 1725, 1640, and 1545 cm$^{-1}$; pmr, δ (at 100 MHz) 0.71 and 0.96 (18 and 19 methyls), 4.14 (3α-proton), 6.25 (doublet, $H_a$, 10 Hz), 7.28 (partially masked doublet, $H_c$: 2Hz), and 8.85 (quartet, $H_b$, 10 Hz and 2 Hz). The synthetic specimen of bufalin was completely identical.

What is claimed is:

1. A compound of the formula

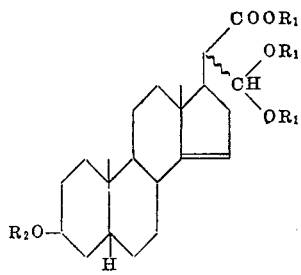

wherein $R_1$ is lower alkyl and $R_2$ is hydrogen or acetyl or benzoyl

2. A compound of the formula

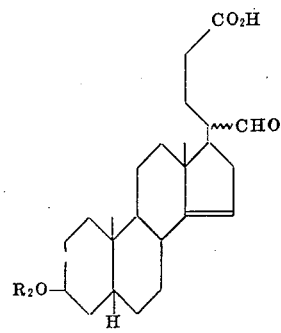

wherein $R_2$ is hydrogen or alkanoyl, aroyl, aralkanoyl or alkaroyl

3. A compound of the formula

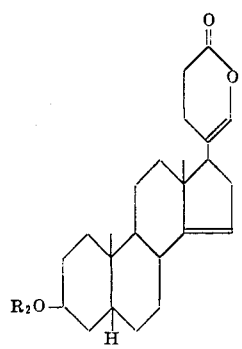

wherein $R_2$ is hydrogen or acyl

4. A compound of formula

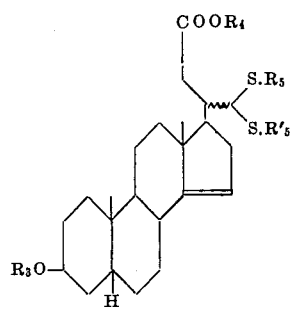

wherein $R_3$ is hydrogen, acetyl or benzoyl or tetrahydro pyranyl $R_4$ is hydrogen or an alkali or alkaline earth metal $R_5$ and $R'_5$ are lower alkyl and when joined together are alkylene of 1-6 carbon atoms.

5. A compound of claim 1 wherein $R_1$ is lower alkyl of one to four carbon atoms and $R_2$ is hydrogen or acetyl.

6. A compound of claim 5 wherein $R_1$ is methyl or ethyl.

7. A compound of claim 2 wherein $R_2$ is hydrogen or acetyl.

8. A compound of claim 3 wherein $R_2$ is hydrogen or acetyl.

9. A compound of claim 4 wherein $R_3$ is hydrogen, acetyl or tetrahydropyranyl, $R_4$ is hydrogen or an alkali metal, $R_5$ and $R'_5$ are ethyl, methyl or propyl, and $R_5$ and $R'_5$ are ethylene.

10. In the process of preparing 14-dehydrobufalin from 14-dehydro digitoxigenin, the sequential steps comprising:

a. sequentially reacting a 3β-acyloxy-14-dehydrodigitoxigenin with
  i. a strong base,
  ii. a strong acid in the presence of an alkanol, and
  iii. an acylating agent to form the corresponding alkyl 3β-acyloxy-20-formyl 21-nor-5β-norchol-14-enate 20-alkyl acetal, b. reacting said 20-alkyl acetal with an alkyl mercaptan or alkylene dithiol to form the corresponding 20-alkylthioacetal or alkylene-thioacetal, c. sequentially reacting the product of step (b) with
  i. a strong base
  ii. an acylating agent to form corresponding 5β-norchol-14-enic acid, d. reacting the product of step (c) with a halogenating agent to form the corresponding 5β-norchol-14-enoyl halide, e. reacting said 5β-norchol-14-enoyl halide with diazo methane to form the corresponding diazo ketone, f. reacting said diazo ketone with silver oxide or a finely divided transition metal in the presence of a base to form the corresponding 5β-chol-14-enic acid 20-alkyl or alkylene thioacetal, g. reacting the product of step (f) with a transition metal halide in the presence of the corresponding oxide to form the corresponding 3β-acyloxy-20-formyl 21-nor-5β-chol-14-enic acid, h. reacting the said 20-formyl-5β-cholenic acid with a strong acid to give the 3β-acyloxy-5β-bufa-14,20-dienolide and i. reacting said 3β-acyloxy 5β-bufadienolide with a dehydrogenating agent.

11. In the process of claim 10 for preparing 14-dehydrobufalin from 14-dehydro digitoxigenin the sequential steps comprising
   a. sequentially reacting a 3β-acetoxy-14-dehydrodigitoxigenin with
      i. sodium hydroxide in methanol,
      ii. p-toluene sulfonic acid in the presence of methanol and
      iii. acetic anhydride in pyridine to form the corresponding 3β-acetoxy-20-formyl-21-nor-5β-norchol-14-enate 20-methylacetal,
   b. reacting said 20-methyl acetal with an ethylene dithiol to form the corresponding 20-ethylenethioacetal,
   c. sequentially reacting the product of step (b) with
      i. sodium hydroxide in methanol,
      ii. acetic anhydride in pyridine to form the corresponding 5β-norchol-14-enic acid,
   d. reacting the product of step (c) with oxalyl chloride to form the corresponding 5β-norchol-14-enoyl chloride,
   e. reacting said 5β-norchol-14-enoyl chloride with diazomethane to form the corresponding diazo ketone
   f. reacting said diazo ketone with silver oxide in the presence of a base and sodium thiosulfate to form the corresponding 5β-chol-14-enic acid 20-ethylene thioacetal,
   g. reacting the product of step (f) with mercuric chloride in the presence of the mercuric oxide to form the corresponding 3β-acetoxy-20-formyl 21-nor-5β-chol-14-enic acid,
   h. reacting the said 20-formyl-5β-cholenic acid with p-toluene sulfonic acid to give the 3β-acetoxy-5β-bufa-14,20-dienolide and
   i. reacting said 3β-acetoxy 5β-bufadienolide with sulfur.

12. In the process of preparing 14-dehydrobufalin from 14-dehydro digitoxigenin the sequential steps comprising
   sequentially reacting a 3β-acyloxy-14-dehydrodigitoxigenin with
      i. a strong base in the presence of an alkanol,
      ii. a strong acid in the presence of an alkanol, and
      iii. an acylating agent to form the corresponding alkyl 3β-acyloxy-20-formyl-21-nor-5β-norchol-14-enate 20-alkylacetal.

13. In the process of claim 12 for preparing 14-dehydrobufalin from 14-dehydrodigitoxigenin the sequential steps comprising
   sequentially reacting a 3β-acetoxy-14-dehydrodigitoxigenin with
      i. sodium hydroxide in methanol,
      ii. p-toluene sulfonic acid in the presence of methanol, and
      iii. An acetylating agent to form methyl acetoxy-20-formyl-21-nor-5β-norchol-14-enate 20-methylacetal.

14. In the process of preparing 14-dehydrobufalin from 14-dehydrodigitoxigenin the step which comprises
   reacting a diazomethyl 3β acyloxy-20formyl-21-nor-5β-norchol-14-en alkylene-or alkyl thioacetal with a reagent selected from the group consisting of finely divided copper, nickel, chromium, silver and silver oxide in the presence of a base to form the corresponding 3β-acyloxy-20-formyl-21-nor-5β-chol-14-enic alkylene or alkyl thioacetal.

15. A process according to claim 14 wherein the reagent comprises an aqueous suspension of silver oxide in the presence of a base.

16. A process according to claim 15 wherein the reagent additionally comprises sodium thiosulfate.

17. A process of claim 16 wherein the 3β-acyloxy group is 3β-acetoxy.

18. In the process of preparing 14-dehydrobufalin from 14-dehydrodigitoxigenin the step which comprises
   reacting a 3β-acyloxy-20-formyl-21-nor-5β-chol-14-enic 20-alkylene or alkylthioacetal with a reagent selected from the metal chloride/metal oxide pairs of nickel, lead, silver, orgenic, antimony, thallium, mercury and lead nitrate/lead oxide, lead acetate/lead oxide and nickel chloride to form the corresponding 3β acetoxy-20-formyl-21 nor-5β-chol-14-enic acid.

19. A process according to claim 18 wherein the reaction is carried out in an alkanoic acid.

20. A process according to claim 19 wherein the acid is glacial acetic acid

21. A process according to claim 20 wherein the reagent is mercuric chloride/mercuric oxide.

22. A process according to claim 21 wherein the 3β-acyloxy group is 3β-acetoxy.

23. In the process of preparing 14-dehydrobufalin from 14-dehydrodigitoxigenin the step which comprises
   dehydrogenating a 3β-acyloxy-5β-bufa-14,20-dienol-ide with sulfur to form the corresponding 3β-acyloxy-14-dehydrobufalin.

24. A process according to claim 23 which comprises heating an intimate mixture of finely divided sulfur with a 3β-acyloxy-5β-bufa-14,20-dienolide in an inert atmosphere.

25. A process according to claim 24 wherein the 3β-acyloxy group is 3β-acetoxy.

* * * * *